P. M. MARKO.
STORAGE BATTERY.
APPLICATION FILED JUNE 10, 1909.

945,564.

Patented Jan. 4, 1910.

WITNESSES
Geo. W. Taylor
C. W. Fairbank

INVENTOR
Paul Max Marko,
BY Munn & Co
ATTORNEYS

UNITED STATES PATENT OFFICE.

PAUL MAX MARKO, OF NEW YORK, N. Y.

STORAGE BATTERY.

945,564.   Specification of Letters Patent.   Patented Jan. 4, 1910.

Application filed June 10, 1909. Serial No. 501,314.

*To all whom it may concern:*

Be it known that I, PAUL MAX MARKO, a subject of the Emperor of Germany, and a resident of the city of New York, borough of Brooklyn, in the county of Kings and State of New York, have invented a new and Improved Storage Battery, of which the following is a full, clear, and exact description.

This invention relates to certain improvements in storage batteries, and more particularly to means whereby the strength of the battery may readily be ascertained without the aid of outside instruments, attachments or connections.

In my improved storage battery the cell or cells are supported in a casing or box, through the walls of which extend the terminals or binding posts from the battery plates. In the wall of this box or casing I insert an electric meter and provide a push button or switch whereby the meter may be thrown into or out of circuit at will. The face of the meter is below or substantially flush with the wall of the casing, so that the meter is protected against accidental injury, and the inner side of the meter and its connections are protected against injury by the acids or gases employed in or escaping from the cells. The electric meter is normally out of circuit, so that it is unaffected by the charging or discharging of the battery. The meter is constructed to specially adapt it to the battery and need have a range of only the capacity of the battery.

Reference is to be had to the accompanying drawings, forming a part of this specification, in which similar characters of reference indicate corresponding parts in all the figures, and in which—

Figure 1:
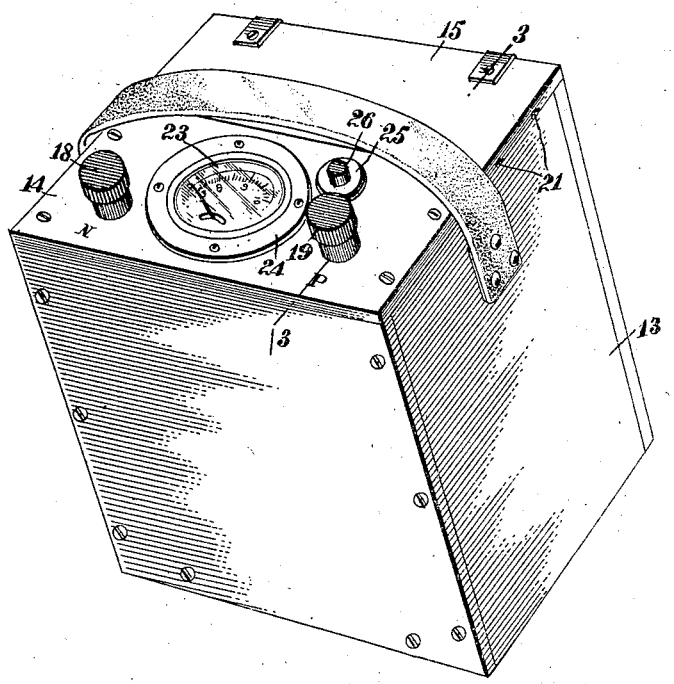
Figure 2:
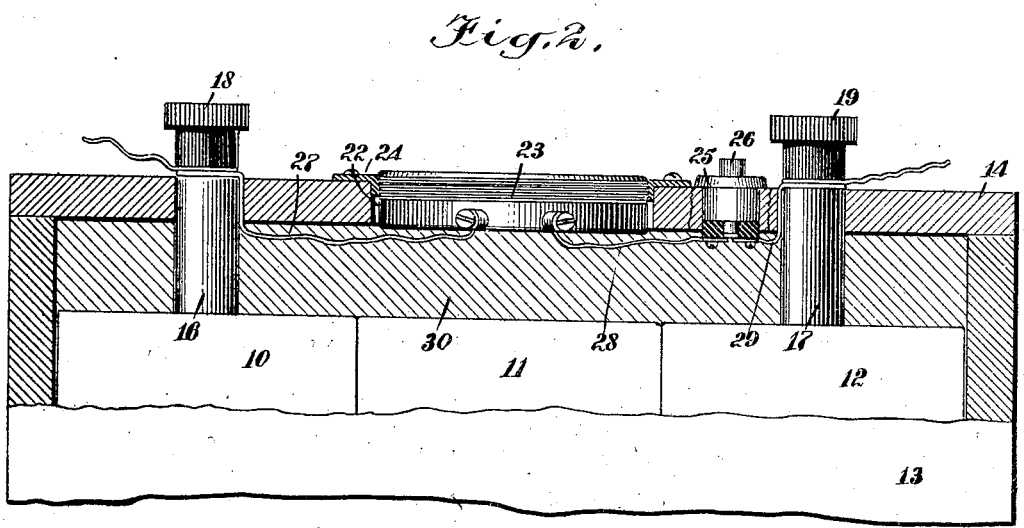
Figure 3:
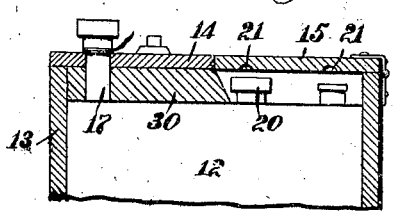

Figure 1 is a perspective view of a battery constructed in accordance with my invention; Fig. 2 is a vertical section along a broken line through the terminals, meter and push button, but on a larger scale; and Fig. 3 is a transverse section substantially on the line 3—3 of Fig. 1, but on a smaller scale.

In the specific form illustrated I employ three battery cells 10, 11 and 12, arranged side by side and inclosed in a box or casing 13. The top of the box or casing is divided into two sections 14 and 15, the former of which is permanently secured in place and the latter of which constitutes a movable closure. The battery plates of the several cells are provided with suitable terminals, only two of which extend through the top of the casing. As shown, a negative terminal 16 of the cell 10 extends through the top 14, adjacent one corner, while a positive terminal 17 of the cell 12 extends through the top at the opposite corner. The positive pole of the cell 10 may be connected to the negative pole of the cell 11, and the positive pole of the cell 11 may be connected to the negative pole of the cell 12, so that the cells may be in series, but the nature of these connections constitutes no portion of my invention and said connections are not illustrated. The terminals 16 and 17, at their outer ends, constitute binding posts and are provided with thumb nuts 18 and 19, by means of which wires may be connected to the battery. Each cell is provided with a filling and ventilating plug 20 below the movable cover section 15, and the latter adjacent its ends, may be provided with ventilating grooves 21, to permit the escape of any gas generated in the cells. The features so far referred to in the detail description of the specific form shown, constitute no portion of my present invention and may be varied at will.

Within the stationary cover section 14, I provide an opening 22 of substantially the size of a small electric meter 23. This electric meter is preferably a voltmeter and may be secured in place in any suitable manner, as, for instance, by threaded engagement with a collar 24. The meter is of substantially the same depth as the top 14 and is inserted so that its upper surface lies in approximately the same plane with the upper surface of said top. Adjacent the meter and also extending through an opening in the top 14, is a circuit closer, preferably in the form of an insulated plug 25 carrying a push button 26. A wire 27 extends from the terminal 16 to one terminal of the meter, a wire 28 extends from the other terminal of the meter to one terminal of the circuit closer, and a wire 29 extends from the other terminal of the circuit closer to the battery terminal 17. The push button 26 is normally held in raised position, so that no current can flow through the meter, but whenever it is desired to ascertain the strength of the battery, it is only necessary to press down on the push button and a short circuit will be formed through the voltmeter and from the terminal 16 to the terminal 17. The voltage of the battery will be immediately indicated by the needle of the meter. The meter is preferably calibrated in accordance with the size of the battery and the purposes for which it is to be employed. If the battery is to be used for generating current for the spark plug of an internal combustion engine, the dial might show as its lowest calibration, the lowest voltage which will give the desired spark, and as its highest calibration, the strength of the battery when the latter is fully charged.

The wires 27, 28 and 29, as well as the terminals to the meter and the connections to the circuit closer, are all inside of the casing and concealed from view and protected from accidental injury. To protect them from injury by gases generated in the cells or from contact with acid employed in the cells, the space between the tops of the cells and the under surface of the top section 14, is preferably filled with a mass 30 of wax or other similar or suitable material. This wax completely covers and insulates all of the connections from the terminal 16 to the terminal 17, as well as the inner surfaces of the circuit closer and meter. Furthermore, it prevents the connections from accidentally loosening and aids in holding the cells in place and against rattling. This mass of wax or other material may completely fill the space beneath the stationary top section 14, and may terminate adjacent the ventilating plugs 20, which are beneath the movable cover section 15.

Having thus described my invention, I claim as new and desire to secure by Letters Patent:

1. In combination, a storage battery cell having positive and negative terminals, a casing inclosing said cell and having apertures through one wall thereof, through which said terminals extend, said wall being provided with a second aperture, a collar secured within said aperture, a voltmeter threaded into said collar and having its outer surface substantially flush with the outer surface of the wall of the casing and visible from the exterior of said casing, and shunt connections within said casing beneath said wall and connecting the terminals of said voltmeter with said battery terminals, one of said connections including a push button, by means of which the shunt may be closed and the strength of the battery ascertained from an inspection of the voltmeter.

2. In combination, a battery cell having positive and negative terminals, a casing inclosing said cell and having a cover formed of a stationary section and a movable section, the terminals from said cell extending through said stationary section, and said cell having a filling-opening beneath said movable section, a voltmeter and a normally open circuit closer inserted within openings in said stationary section, connections between said voltmeter, circuit closer, and terminals and within said casing, whereby the voltmeter may be thrown into circuit, and a filling of insulating material between said cell and said stationary cover section for insulating and protecting said connections.

In testimony whereof I have signed my name to this specification in the presence of two subscribing witnesses.

PAUL MAX MARKO.

Witnesses:
 CLAIR W. FAIRBANK,
 JOHN P. DAVIS.